A. F. ODIEN & C. DAYFIELD.
HORSE RELEASER.
APPLICATION FILED JAN. 12, 1910.
972,635.
Patented Oct. 11, 1910.
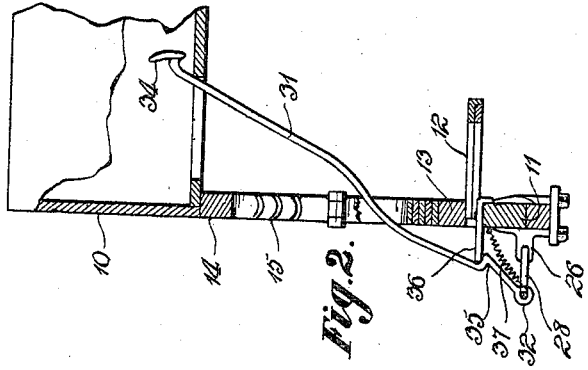
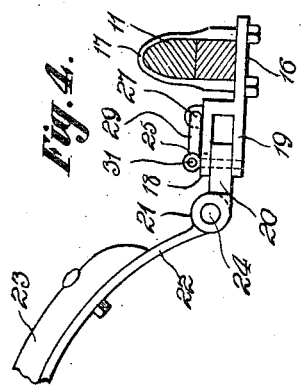
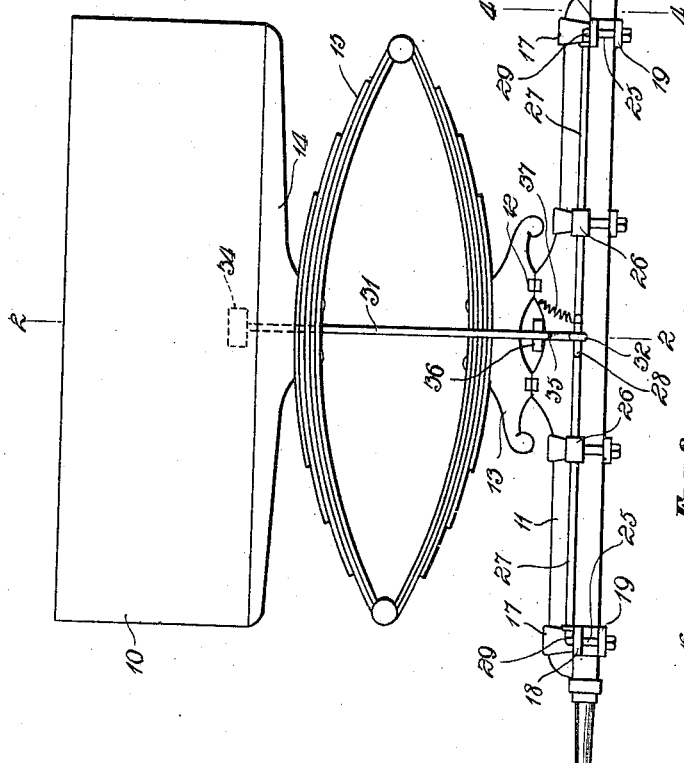
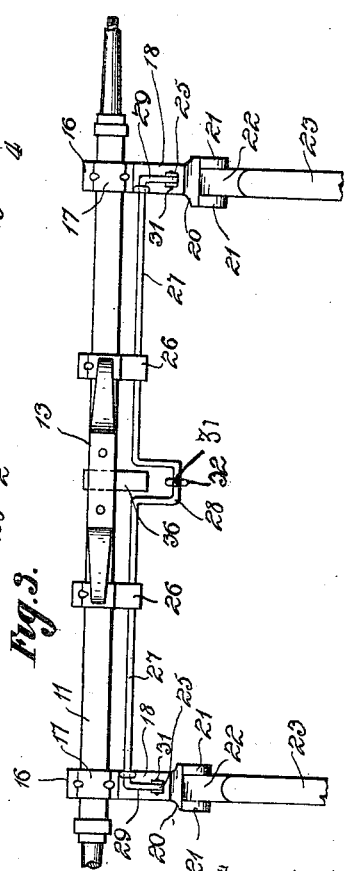
Witnesses
C. C. Chandler
C. N. Woodward
Inventors
Ambrose F. Odien
Charles Dayfield
By Chandler & Chandler
Attorneys

UNITED STATES PATENT OFFICE.

AMBROSE F. ODIEN AND CHARLES DAYFIELD, OF TURNER, MICHIGAN.

HORSE-RELEASER.

972,635.  Specification of Letters Patent. Patented Oct. 11, 1910.

Application filed January 12, 1910. Serial No. 537,662.

*To all whom it may concern:*

Be it known that we, AMBROSE F. ODIEN and CHARLES DAYFIELD, citizens of the United States, residing at Turner, in the county of Arenac, State of Michigan, have invented certain new and useful Improvements in Horse-Releasers; and we do hereby declare the following to be a full, clear, and exact description of the invention, such as will enable others skilled in the art to which it appertains to make and use the same.

This invention relates to improvements in horse releasers employed for instantly detaching horses from vehicles in event of the horse becoming unruly or attempting to run away, and has for one of its objects to improve the construction and increase the efficiency and utility of devices of this character.

Another object of the invention is to provide a simply constructed device of this character wherein the coupling means between the horse and the vehicle are retained in coupled relations against the action of a spring by a trip device, and means provided for releasing the trip device and permitting the spring to act to release the coupling devices.

With these and other objects in view, the invention consists in certain novel features of construction as hereinafter shown and described and then specifically pointed out in the claims; and, in the drawings illustrative of the preferred embodiment of the invention, Figure 1 is a front elevation of a portion of a vehicle including the body and the forward axle with the improvement applied, Fig. 2 is a sectional view on the line 2—2 of Fig. 1, Fig. 3 is a plan view of the forward axle illustrating the construction more fully, Fig. 4 is a sectional view, enlarged, on the line 4—4 of Fig. 1.

The improved device may be applied without material structural changes to vehicles of various forms and constructions, but for the purpose of illustration is shown applied to a conventional vehicle including a body 10, a forward axle 11, a fifth-wheel mechanism 12, a lower spring bolster 13, an upper spring bolster 14 and a spring 15.

Connected to the axle near its ends at the points where the thill clips are usually attached are novel forms of clip devices whereby the thills are coupled to the axle, but as these clip devices are precisely alike, the description of one will suffice for both. Each clip device comprises a base bar 16 coupled to the axle 11 by the usual U-bolt device 17 and with the forward portion formed with a socket comprising spaced upper and lower members 18—19. Fitting in each of these sockets is a coupling member 20 having perforated ears 21 at the outer ends to receive the shackle members 22 of the thills 23. Each of the shackle members is pivotally united to one of the coupling members by a pin 24. The members 18—19 of the clip device are provided with vertical apertures registering with a similar aperture through the coupling member 20 to receive a coupling pin 25, as shown. By this means the thills are coupled to the axle and detachable therefrom by removing the pins 25, as will be obvious. Means are provided in the improved device for detaching the pins 25 when the horse is to be released, and this novel mechanism will now be described.

Connected to the axle 11 are spaced clip devices including bearing members 26, and mounted for rotation through these guide members is a rod 27 having a crank or offset band 28 centrally thereof and outturned at the ends as shown at 29. Each of the outturned ends bears upon the upper face of the portion 18 of the thill clip device, and is pivoted at its outer ends respectively at 31 to the pins 25. By this arrangement it will be obvious that when the rod 27 is oscillated the pins 25 will be withdrawn from the coupling members 20 and release the thills and the horse connected thereto.

A spring 37 is connected to the crank 28 and operates to maintain it yieldably in position to maintain the pins 25 withdrawn from the coupling members, and a trip mechanism is provided for holding the rod with the outturned terminals 29 in downward position with the pins engaged with the coupling members 20, and this trip device comprises a rod 31 swingingly coupled at 32 to the crank 28 formed in the rod 27, and curving rearwardly and extending through the spring 15 and upwardly through the floor of the body 10 and terminating at 34 in a foot rest located above the floor of the body 10 and in convenient position for the foot of the driver. The rod 31 is also formed with a lateral bend 35 near its lower pivoted end, and the axle 11 is provided with a suitable plate 36 with which the bend 35 engages when the rod is in its downward position, as shown. The offset or bend 35 and the stop plate 36 are so located that when the offset is engaged with the stop plate the crank 28 will be maintained in its downward position and against the resistance of the pull spring 37 connected between the axle 11 and the crank 28. The pull spring 37 exerts its force to elevate the crank 28 and oscillate the rod 27, while the rod 31 operates to maintain the crank in its downward position and thus maintain the pins 25 in locked relations to the coupling members of the thill.

While the horse is acting normally the rod 31 remains in its rearward position and maintains the pins 25 in their locked relations to the coupling members, but in event of the horse becoming unruly or attempting to run away the driver can instantly release the horse by simply pressing his foot against the rest 34 thus releasing the offset 35 from the stop plate 36 and permitting the pull spring 37 to oscillate the rod 27 and elevate the pins 25 and release the thills and the horse attached thereto.

The improved device is simple in construction, can be applied without material structural changes to vehicles of various forms and sizes and to axles of various forms, and operates effectually for the purposes described.

What is claimed is:—

1. The combination with a vehicle including the body and the forward axle, of thill coupling devices connected to said axle, a rod mounted for oscillation upon said axle and provided with an offset, coupling means between said rod and said thill coupling devices, another rod swinging at one end to said offset and extending into the vehicle body, said rod having a lateral bend intermediate the ends thereof, and a stop carried by the axle and engaging said lateral bend.

2. The combination with a vehicle, of a pair of thill couplings each including a thill retaining member movable into and out of active position, mechanism connected with each thill retaining member for moving the latter into and out of active position, a spring connected with said mechanism and disposed to hold the latter with the thill retaining members normally and yieldably in inactive positions, a foot-operated bar connected with said mechanism for moving and holding the latter with the thill retaining members in active positions, said bar extending into the body of the vehicle and provided with an angular bend forming a catch member, and a keeper disposed to coöperate with the catch member to hold the bar with the thill retaining members in active positions and into and out of engagement with which keeper the catch member of the bar is movable.

In testimony whereof, we affix our signatures, in presence of two witnesses.

AMBROSE F. ODIEN.
CHARLES DAYFIELD.

Witnesses:
R. J. SPOFFORD,
D. A. FOLEY.